US010611107B2

(12) United States Patent
Jobe et al.

(10) Patent No.: US 10,611,107 B2
(45) Date of Patent: Apr. 7, 2020

(54) PROCESS FOR MANUFACTURING CONTACT LENSES

(71) Applicant: Novartis AG, Basel (CH)

(72) Inventors: Oli Jobe, Auburn, GA (US); Uwe Haken, Norcross, GA (US)

(73) Assignee: Alcon Inc., Fribourg (CH)

( * ) Notice: Subject to any disclaimer, the term of this patent is extended or adjusted under 35 U.S.C. 154(b) by 471 days.

(21) Appl. No.: 15/347,150

(22) Filed: Nov. 9, 2016

(65) Prior Publication Data
US 2017/0173901 A1  Jun. 22, 2017

Related U.S. Application Data

(60) Provisional application No. 62/270,938, filed on Dec. 22, 2015.

(51) Int. Cl.
*B29D 11/00* (2006.01)
*B29C 59/10* (2006.01)
(Continued)

(52) U.S. Cl.
CPC ........ *B29D 11/00134* (2013.01); *B29C 59/10* (2013.01); *B29D 11/0048* (2013.01);
(Continued)

(58) Field of Classification Search
CPC ........ B29D 11/00134; B29D 11/00192; B29D 11/0048; B29C 59/10; G02C 7/049
See application file for complete search history.

(56) References Cited

U.S. PATENT DOCUMENTS 4,444,711 A    4/1984 Schad
4,460,534 A    7/1984 Boehm et al.
(Continued)

FOREIGN PATENT DOCUMENTS

JP    H06170857 A    6/1994

OTHER PUBLICATIONS

Enercon: "Backside Treatment Symptoms and Remedies—Enercon Industries", Jan. 1, 2002 (Jan. 1, 2002), XPO55336804, Retried from the internet: URL:http://www.enerconind.com/treating/support/maintenance-tips/backside-treatment-symptoms-and-remedies.aspx [retrieved on Jan. 19, 2017] the whole document.

*Primary Examiner* — Mathieu D Vargot
(74) *Attorney, Agent, or Firm* — Sheng-Hsin Hu

(57) ABSTRACT

The invention provides a method of making ophthalmic lenses with an enhanced quality and enhanced yield achieved by using molds having been treated on back surface of mold with corona discharge technique. The method comprises the steps of obtaining a mold for cast-molding contact lenses from a lens formulation, wherein the mold comprises a first mold half having a first molding surface and a first back surface, a second mold half having a second molding surface and a second back surface, wherein when the first and second mold are configured to receive each other such that a lens forming cavity is formed between the first molding surface and the second molding surface and applying a corona discharge on one of the first and second back surfaces so that the molding surface of the mold with the treated back surface has an average water contact angle smaller than the molding surface of the mold with untreated mold by about 0.1 degrees to about 6 degrees.

9 Claims, 1 Drawing Sheet

(51) Int. Cl.
*G02C 7/04* (2006.01)
*B29K 105/00* (2006.01)
*B29L 11/00* (2006.01)

(52) U.S. Cl.
CPC ........ B29D 11/00192 (2013.01); G02C 7/049 (2013.01); *B29K 2105/0061* (2013.01); *B29L 2011/0041* (2013.01)

(56) References Cited

U.S. PATENT DOCUMENTS

| | | | |
|---|---|---|---|
| 5,158,718 A | | 10/1992 | Thakrar et al. |
| 5,326,505 A | | 7/1994 | Adams et al. |
| 5,804,107 A | * | 9/1998 | Martin ................... B29C 31/00 264/1.36 |
| 5,843,346 A | | 12/1998 | Morrill |
| 5,894,002 A | | 4/1999 | Boneberger et al. |
| 2006/0202368 A1 | | 9/2006 | Matsuzawa et al. |
| 2015/0151500 A1 | * | 6/2015 | Yin ................... B29D 11/00038 264/1.38 |

* cited by examiner

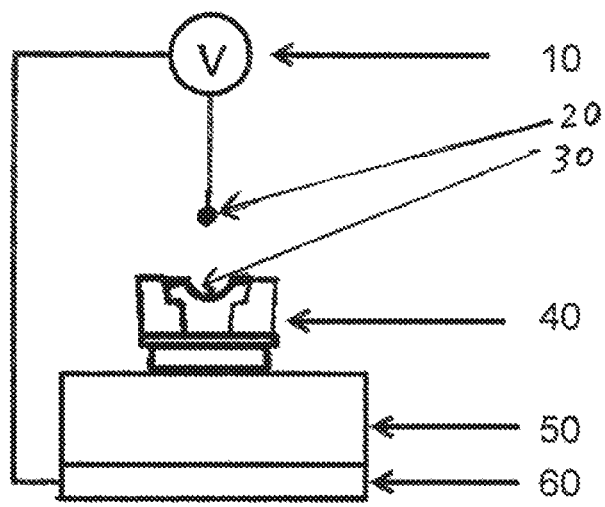

PROCESS FOR MANUFACTURING CONTACT LENSES

This application claims the benefit under 35 U.S.C. § 119(e) of U.S. provisional Application No. 62/270,938 filed Dec. 22, 2015, the content of which are incorporated by reference in its entirety.

The present invention relates generally to a process for producing contact lenses, in particular, silicone hydrogel contact lenses, using molds having been treated on back surface of mold with corona discharge technique.

BACKGROUND OF THE INVENTION

In the manufacture of contact lenses by the so-called full-mold process (casting process), contact lenses are usually produced by dispensing a specific amount of a polymerizable contact lens material into the female mold half. The mold is then closed by putting on the male mold half, a molding cavity being enclosed between the two molding surfaces. In that molding cavity there is the previously dispensed contact lens material, which is polymerized to form an as yet unhydrated contact lens. Subsequently, the mold is opened and the polymerized but as yet unhydrated contact lens is removed and further processed.

Unfortunately, it is not possible as a rule to predict reliably to which of the two mold halves the contact lens will adhere: in some cases it adheres to the male mold half (mold half with the convex molding surface) and, in others, it stays in the female mold half (mold half with the concave molding surface). After opening of the mold, therefore, a check must be made in every case to discover on or in which mold half the polymerized but as yet unhydrated contact lens is located.

Therefore, there is a need to provide a process for casting—molding contact lenses with enhanced quality and enhanced yield achieved by omitting the previously required check to discover on or in which mold half the contact lens is located after the mold has been opened. Therefore, the process can nevertheless proceed automatically since it can reliably be assumed that the contact lens will adhere to one of the two mold halves. The process can also be simplified to need to optimize only for one mold half.

SUMMARY OF THE INVENTION

The invention relates to a method for producing contact lenses, comprising the steps of: (1) obtaining a mold for cast-molding contact lenses from a lens formulation, wherein the mold comprises a first mold half having a first molding surface and a first back surface, a second mold half having a second molding surface and a second back surface, wherein when the first and second mold halves are configured to receive each other such that a lens forming cavity is formed between the first molding surface and the second molding surface; (2) applying a corona discharge on one of the first and second back surfaces so that the molding surface of the mold with the treated back surface has an average water contact angle smaller than the molding surface of the mold with untreated mold by about 0.1 degrees to about 6 degrees; (3) introducing a lens formulation into the lens-forming cavity formed between the first and second molding surfaces; (4) curing the lens formulation in the cavity to form a contact lens; and (5) opening the mold and removing the molded contact lens, wherein the method is characterized by retaining the contact lens on the mold having corona discharge treated back surface and producing low percentages of lens tearing.

These and other aspects, features and advantages of the invention will be understood with reference to the drawing FIGURES and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIG. 1 is a corona treatment set up to be used with an example embodiment of the present invention.

DETAILED DESCRIPTION OF EXAMPLE EMBODIMENTS

The present invention may be understood more readily by reference to the following detailed description of the invention taken in connection with the accompanying drawing FIGURES, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used in this application, the term "ophthalmic lens" refers to an intraocular lens, a contact lens (hard or soft), or a corneal onlay. "Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. As used in this application, the term "silicone hydrogel contact lens" refers to a contact lens comprising a silicone hydrogel material.

As used in this application, the term "hydrogel" or "hydrogel material" refers to a crosslinked polymeric material which is not water-soluble and can contains at least 10% by weight of water within its polymer matrix when fully hydrated.

As used in this application, the term "non-silicone hydrogel" refers to a hydrogel that is theoretically free of silicon.

As used in this application, the term "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "vinylic monomer" refers to a compound that has one sole ethylenically unsaturated group and can be polymerized actinically or thermally.

As used in this application, the term "olefinically unsaturated group" or "ethylenically unsaturated group" is employed herein in a broad sense and is intended to encompass any groups containing at least one carbon-carbon double bond (C=C). Exemplary ethylenically unsaturated groups include without limitation acryloyl, methacryloyl, allyl, vinyl, styrenyl, or other C=C containing groups.

As used in this application, the term "hydrophilic vinylic monomer" refers to a vinylic monomer which as a homopolymer typically yields a polymer that is water-soluble or can absorb at least 10 percent by weight water.

As used in this application, the term "hydrophobic vinylic monomer" refers to a vinylic monomer which as a homopolymer typically yields a polymer that is insoluble in water and can absorb less than 10 percent by weight water.

As used in this application, the term "macromer" or "prepolymer" refers to a medium and high molecular weight compound or polymer that contains two or more ethylenically unsaturated groups. Medium and high molecular weight typically means average molecular weights greater than 700 Daltons.

As used in this application, the term "crosslinker" refers to a compound having at least two ethylenically unsaturated groups. A "crosslinking agent" refers to a crosslinker having a molecular weight of about 700 Daltons or less.

As used in this application, the term "water contact angle" refers to an average water contact angle (i.e., contact angles measured by Sessile Drop method), which is obtained by averaging 10 measurements of contact angles.

As used in this application, the term "polymer" means a material formed by polymerizing/crosslinking one or more monomers or macromers or prepolymers.

As used in this application, the term "molecular weight" of a polymeric material (including monomeric or macromeric materials) refers to the weight-average molecular weight unless otherwise specifically noted or unless testing conditions indicate otherwise.

The term "fluid" as used herein indicates that a material is capable of flowing like a liquid.

The present invention is generally related to a process for making (cast molding) silicone hydrogel contact lenses. The present invention is partly based on discovery that a corona discharge treatment on the back side of a mold can be used to slightly increase the surface hydrophilicity of the molding surfaces of a mold to retain the ophthalmic lens on the mold half having corona discharge treated back surface and produce low percentages of lens tearing. The hydrophilicity of a molding surface of a mold can be characterized by water contact angle on the molding surface. For reference, an uncoated glass or polypropylene mold for making contact lenses typically has a water contact angle of about 105.7 degree. It is found that when applying a corona discharge on one of the first and second back surfaces so that the molding surface of the mold with the treated back surface has an average water contact angle smaller than the molding surface of the mold with untreated mold by about 0.1 degrees to about 6 degrees; preferably by about 0.3 degrees to about 4 degrees; even more preferably by about 0.7 degrees to about 2 degrees to make silicone hydrogel contact lenses retaining on the mold having corona discharge treated back surface and producing low percentages of lens tearing. Here, low percentage refers to lower than 5%.

A process of the invention is also partly based on discovery that it is very difficult (if not impossible) to increase the surface hydrophilicity of the molding surfaces of a mold half less than reducing contact angle only smaller than 6 degree by applying corona discharge treatment on the molding surface of a mold half. If a corona discharge applies to the molding surface of a mold half, the treatment will significantly increase the surface hydrophilicity of the molding surfaces of a mold (decrease contact angle more than 6 degrees). Although the treatment can also retain the contact lens on the mold half having corona discharge treated molding surface, the contact lens is stuck to the mold so strongly that high percentage of lens is torn during the lens is removed from the mold half. Here, high percentage refers to more than 5%.

The term "increased surface hydrophilicity" in reference to a molding surface of the mold with the treated back surface has an average water contact angle smaller than the molding surface of the mold with untreated mold.

The present invention is generally related to a method for producing ophthalmic lenses, comprising the steps of: (1) obtaining a mold for cast-molding contact lenses from a lens formulation, wherein the mold comprises a first mold half having a first molding surface and a first back surface, a second mold half having a second molding surface and a second back surface, wherein when the first and second mold halves are configured to receive each other such that a lens forming cavity is formed between the first molding surface and the second molding surface; (2) applying a corona discharge on one of the first and second back surfaces so that the molding surface of the mold with the treated back surface has an average water contact angle smaller than the molding surface of the mold with untreated mold by about 0.1 degrees to about 6 degrees; (3) introducing a lens formulation into the lens-forming cavity formed between the first and second molding surfaces; (4) curing the lens formulation in the cavity to form an ophthalmic lens; and (5) opening the mold and removing the molded ophthalmic lens, wherein the method is characterized by retaining the ophthalmic lens on the mold having corona discharge treated back surface and producing low percentages of lens tearing.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

In a conventional cast-molding process where a mold is used only once (i.e., disposable or single use), the first and second molding surface of a mold are pressed against each other to form a circumferential contact line which defines the edge of a result contact lens. Because the close contact of the molding surfaces can damage the optical quality of the molding surfaces, the mold cannot be reused.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used.

In a preferred embodiment, conventional molds are used and the silicone-hydrogel lens-forming composition is cured actinically or thermally to form a SiHy contact lens.

Corona treatment is a surface modification technique that uses a low temperature corona discharge to impart changes in the properties of a surface. The corona is generated by the application of high voltage to an electrode that has a tip. The plasma forms at the tip. A linear array of electrodes is often used to create a curtain of corona plasma. Materials such as plastics, cloth, or paper may be passed through the corona plasma curtain in order to change the surface energy of the material.

Corona treatment is a surface modification method using a low temperature corona discharge to increase the surface energy of a material, often polymers and natural fibers. FIG. 1 shows an example for the pre-treatment of the back surface of a male mold 30, it is possible to use customary commercial corona-discharge devices, for example the device with the type name LabTEC produced by Tantec EST, Inc. at Glendale Heights, Ill. USA. The bombardment time may be, for example, about one second, the frequency may be in the range of about 10 kHz to 35 kHz and the voltage between the electrodes may be approximately from 10 kV to 20 kV. These values are, however, to be regarded merely as examples and other parameters are also possible. The electrode 20, which is connected to a high voltage high frequency source 10, facing the back surface of a male mold (30). The distance between the electrode and the top of the mold is about 0.5 mm to 10 mm. The treatment time is about 0.1 second to about 5.0 seconds, preferably, about 0.2 second to about 1 second.

Average water contact angles (i.e., sessile drop) on a molding surface of a mold can be measured using a contact angle measurement device, for example a VCA Optima manufactured by AST, Inc., of Boston, Mass. This equipment is capable of measuring advancing or receding contact angles or sessile (static) contact angles. The measurements are performed on the molding surface of a mold half (e.g., female or male mold half or both). The mold half is then mounted on the contact angle measurement pedestal, and the sessile drop contact angle is measured using the software provided by the manufacturer. The DI water used for measuring the contact angle has a resistivity greater than about 18 MΩcm and the droplet volume used is about 2 µl.

A silicone hydrogel (SiHy) contact lens formulation for cast-molding or spin-cast molding of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a crosslinking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

In accordance with the invention, a SiHy lens formulation can be a solution or a melt at a temperature from about 20° C. to about 85° C. Preferably, a polymerizable composition is a solution of all desirable components in a suitable solvent, or a mixture of suitable solvents.

A SiHy lens formulation can be prepared by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application. All of them can be used in a method of the invention. A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, filcon II 3, can also be used in a method of the invention.

While the invention has been described with reference to preferred and example embodiments, it will be understood by those skilled in the art that a variety of modifications, additions and deletions are within the scope of the invention, as defined by the following claims.

The front (direct) or back side (indirect) surfaces of the BC molds are corona treated at a fixed voltage and power (14 kV and 20 W) with variable electrode distance, time, and holder designs. The treatment condition is with:

BC mold upside down (opposite side facing the electrode)—Concave metal holder
Electrode 8.69 mm from the top of the mold
0.2 second treatment time.

With this condition, corona treatment is repeated 19 times. 190 lenses are made. 99% of these lenses are on the male molds. The lenses are easy to de-lens. The mold half could be stretched and deformed with an arbor press and the contact lens could be easily picked up with a suction cup.

In the study a direct treatment of the molding surface of the male mold half caused the lens sticking too heavily on the male mold half, such that it was not possible to remove the lens from the male mold half.

What is claimed is:

1. A method for producing contact lenses, comprising the steps of:
   (1) obtaining a mold for cast-molding contact lenses from a lens formulation, wherein the mold comprises a first mold half having a first molding surface and a first back surface, a second mold half having a second molding surface and a second back surface, wherein when the first and second mold are configured to receive each other such that a lens forming cavity is formed between the first molding surface and the second molding surface;
   (2) applying a corona discharge on one of the first and second back surfaces so that the molding surface of the mold with the treated back surface has an average water contact angle smaller than the molding surface of the untreated mold by about 0.1 degrees to about 6 degrees;
   (3) introducing a lens formulation into the lens-forming cavity formed between the first and second molding surfaces;
   (4) curing the lens formulation in the cavity to form a contact lens; and
   (5) opening the mold and removing the molded contact lens, wherein the method is characterized by retaining the contact lens on contact lens having corona discharge treated back surface and producing low percentages of lens tearing.

2. The method of claim 1, wherein the mold is a disposable mold made of a plastic material.

3. The method of claim 1, wherein the contact lens is a silicone hydrogel contact lens.

4. The method of claim 1, the molding surface of the mold with the treated back surface has an average water contact angle smaller than the molding surface of the untreated mold by about 0.3 degrees to about 4 degrees.

5. The method of claim 4, wherein the molding surface of the mold with the treated back surface has an average water contact angle smaller than the molding surface of the untreated mold by about 0.5 degrees to about 3 degrees.

6. The method of claim 5, wherein the molding surface of the mold with the treated back surface has an average water contact angle smaller than the molding surface of the untreated mold by about 0.7 degrees to about 2 degrees.

7. The method of claim 1, wherein the corona discharge is applied by an electric discharge created between two electrodes.

8. The method of claim 7, wherein the power of the corona discharge applied is at least about 10 Watts.

9. The method of claim 8, wherein the corona discharge is applied for a period of about 0.2 second to about 1 second.

* * * * *